March 31, 1931. N. LESTER Re. 18,014

DIE CASTING MACHINE

Original Filed Dec. 22, 1926 5 Sheets-Sheet 1

WITNESS
H. L. Meade

INVENTOR.
Nathan Lester
BY
Denison & Thompson
ATTORNEYS.

March 31, 1931. N. LESTER Re. 18,014

DIE CASTING MACHINE

Original Filed Dec. 22, 1926 5 Sheets-Sheet 2

WITNESS
H. L. Meade.

INVENTOR.
Nathan Lester
BY
Denison & Thompson
ATTORNEYS.

March 31, 1931. N. LESTER Re. 18,014

DIE CASTING MACHINE

Original Filed Dec. 22, 1926 5 Sheets-Sheet 3

WITNESS
H. L. Meade.

INVENTOR.
Nathan Lester
BY
Denison Thompson
ATTORNEYS.

March 31, 1931. N. LESTER Re. 18,014

DIE CASTING MACHINE

Original Filed Dec. 22, 1926 5 Sheets-Sheet 4

INVENTOR.
Nathan Lester
BY
Denison Thompson
ATTORNEYS.

WITNESS.
H. L. Meade

March 31, 1931. N. LESTER Re. 18,014

DIE CASTING MACHINE

Original Filed Dec. 22, 1926 5 Sheets-Sheet 5

Witness.
H. L. Meade

INVENTOR.
Nathan Lester
BY
Duncan & Thompson
ATTORNEYS.

Reissued Mar. 31, 1931

Re. 18,014

UNITED STATES PATENT OFFICE

NATHAN LESTER, OF WORCESTER, MASSACHUSETTS, ASSIGNOR TO P. & R. TOOL COMPANY, INC., OF WORCESTER, MASSACHUSETTS, A CORPORATION OF MASSACHUSETTS

DIE-CASTING MACHINE

Original No. 1,673,833, dated June 19, 1928, Serial No. 156,477, filed December 22, 1926. Application for reissue filed June 28, 1929. Serial No. 374,603.

This invention relates to a machine for casting metals in metal molds, known as dies.

The principal objects of the invention are to provide a separable die of the ordinary type with means for opening and closing it, preferably under oil pressure, and with means whereby when the die is opened the casting will be ejected by the die operating means; to provide controlling mechanism by which the proper sequence of operations is caused to take place without any attention on the part of the operator except to turn a lever for opening and closing the dies and another lever for operating the pump; to construct the mechanism for performing the two operations in such a way that the operator cannot turn either handle at the wrong time and that the metal cannot be forced out of the pump unless the mold is closed and forced up to casting position; to provide means operated by the die operating mechanism for moving the pump in the melting pot or ladle up to the position for casting and making sure that the same is in that position before the metal is forced into the mold; to provide a casting pump in which the nozzle will move with the pump accurately to enter the sprue in such a way as to prevent the formation of a projection on the cast metal that would prevent or interfere with the removal of the casting; to provide a movable pump normally submerged in the metal in the casting pot when not in casting position for the purpose of keeping it heated and filling it with metal; to provide an air operated pump with a metal ejecting nozzle and an air receiving nozzle, so related that they will both come simultaneously into proper position to connect the pump with its air supply and the dies; to provide means for cooling the stationary gland of the mold, which really constitutes the sprue, in order to prolong the life of this important element, and to provide improvements in the mechanisms and various features of construction in carrying out these objects.

Reference is to be had to the accompanying drawings in which:—

Figure 7:
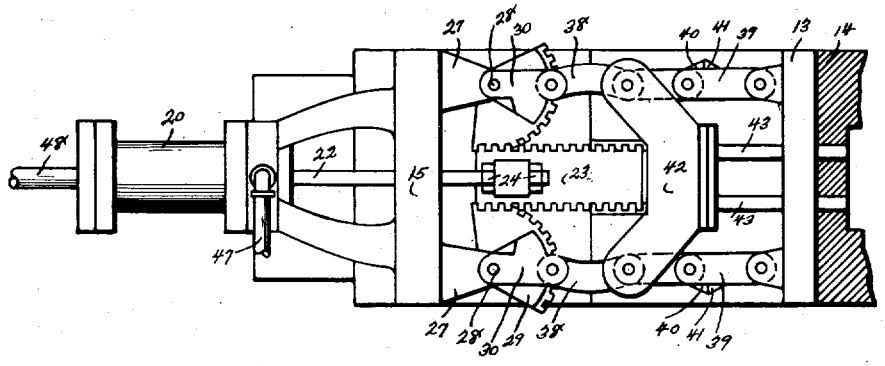
Figure 8:
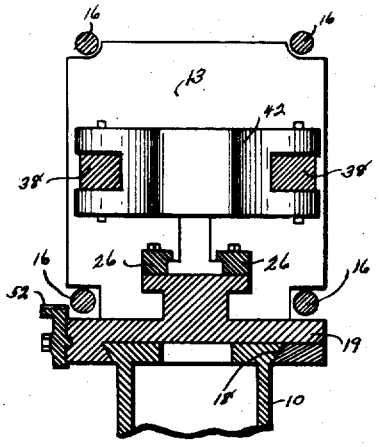
Figure 9:
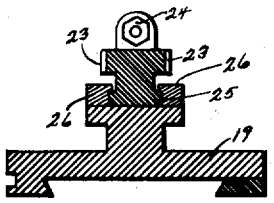

Figures 8 and 9 are sectional views on the lines 8—8 and 9—9, respectively of Figure 7.

Figure 10:
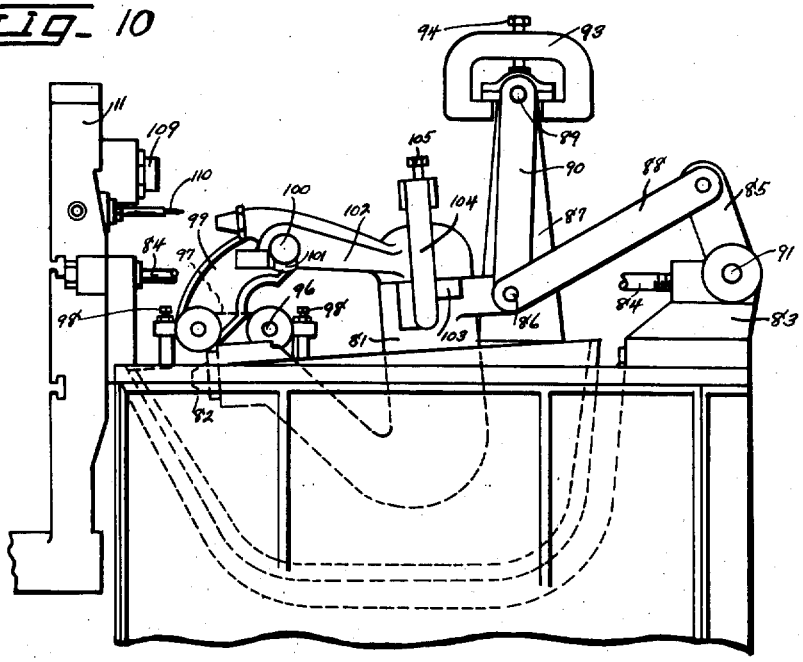

Figure 10 is an enlarged side view of the pump and its actuating mechanism.

Figure 11:
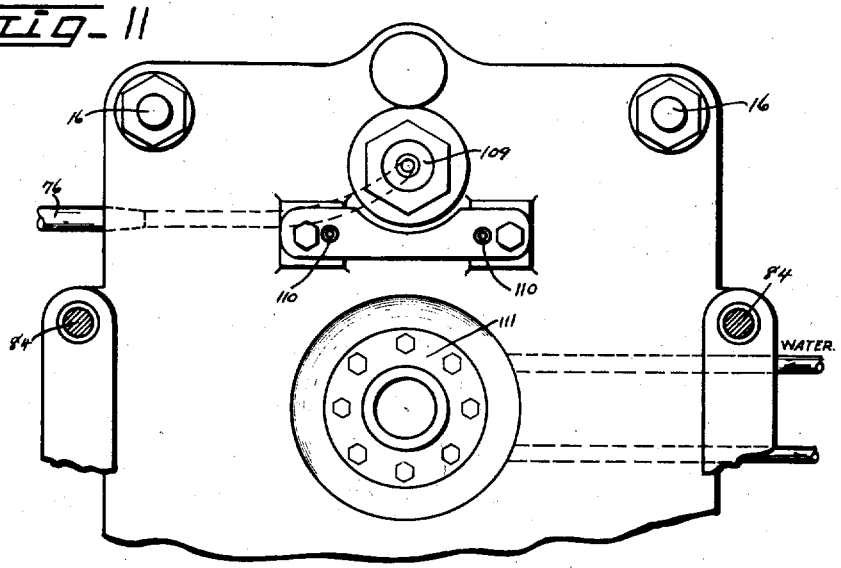

Figure 11 is a front elevation on enlarged scale of the front mold wall showing the air connections at this point and the water cooling means for the sprue or gland.

Figure 12:
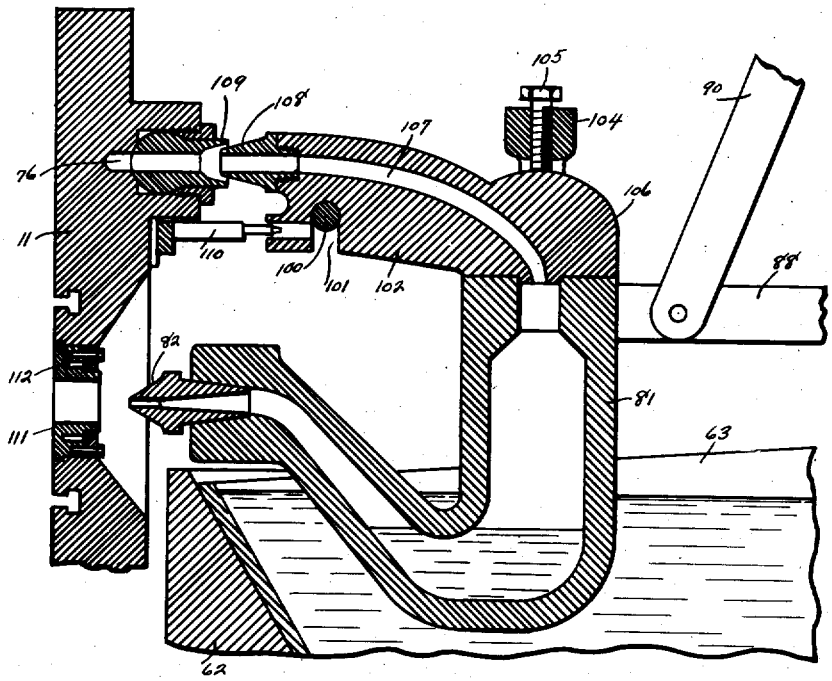

Figure 12 is a central longitudinal sectional view of the pump approaching casting position.

Figure 13:
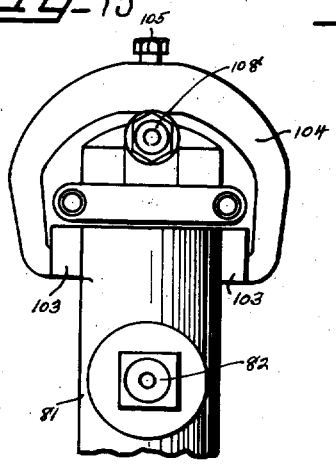

Figure 13 is an end view of the same.

Figure 14:
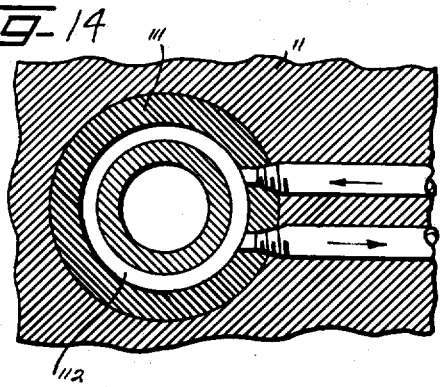

Figure 14 is a sectional view of the cooling device above mentioned; and

Figures 1, 2, 15, 16, 17:
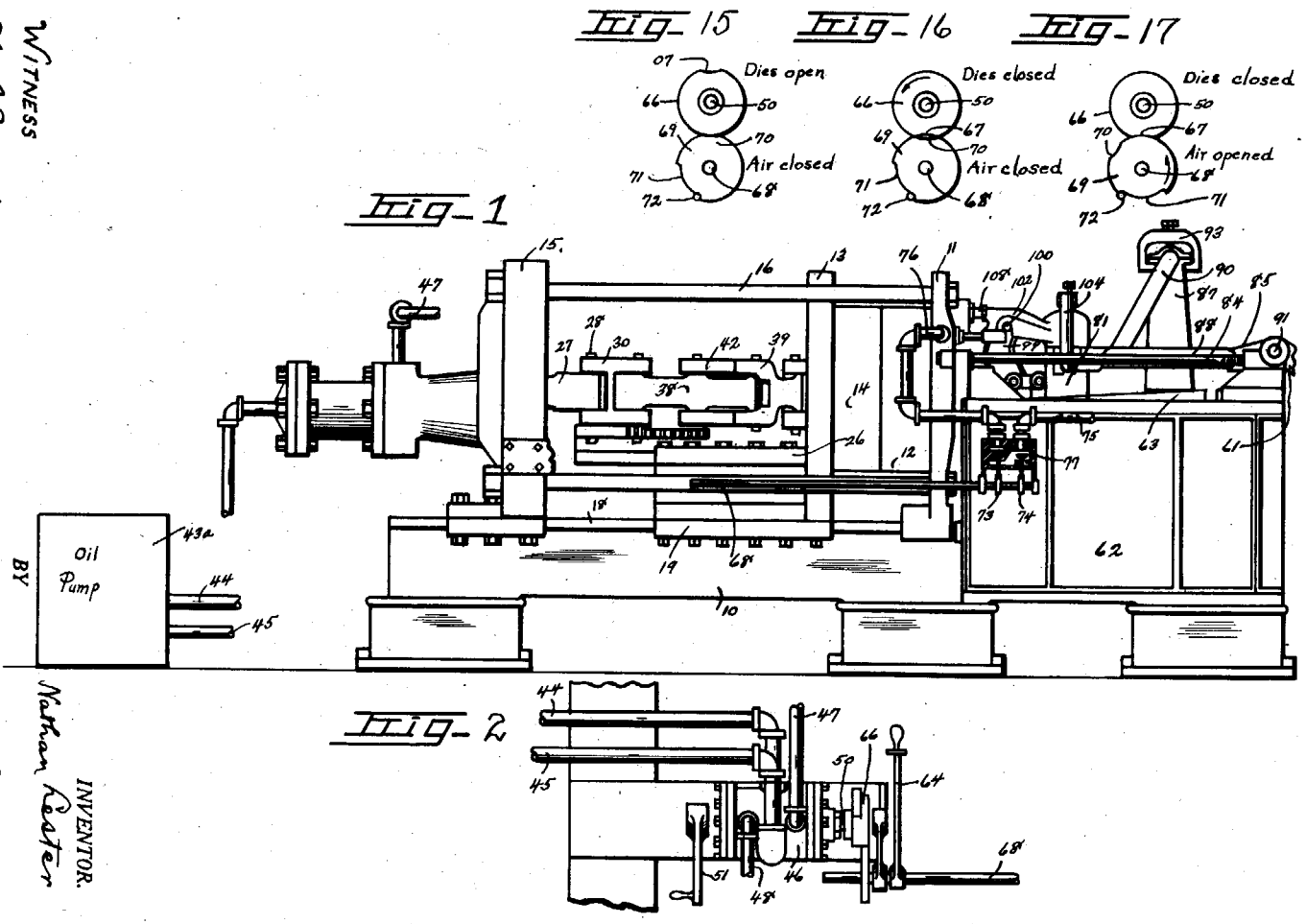
Figure 1 is a side view of a complete die casting machine constructed in accordance with this invention.
Figure 2 is a plan of means for controlling the admission of power fluid to the cylinder which operates the dies and air to the pump.
Figures 3, 4, 5:
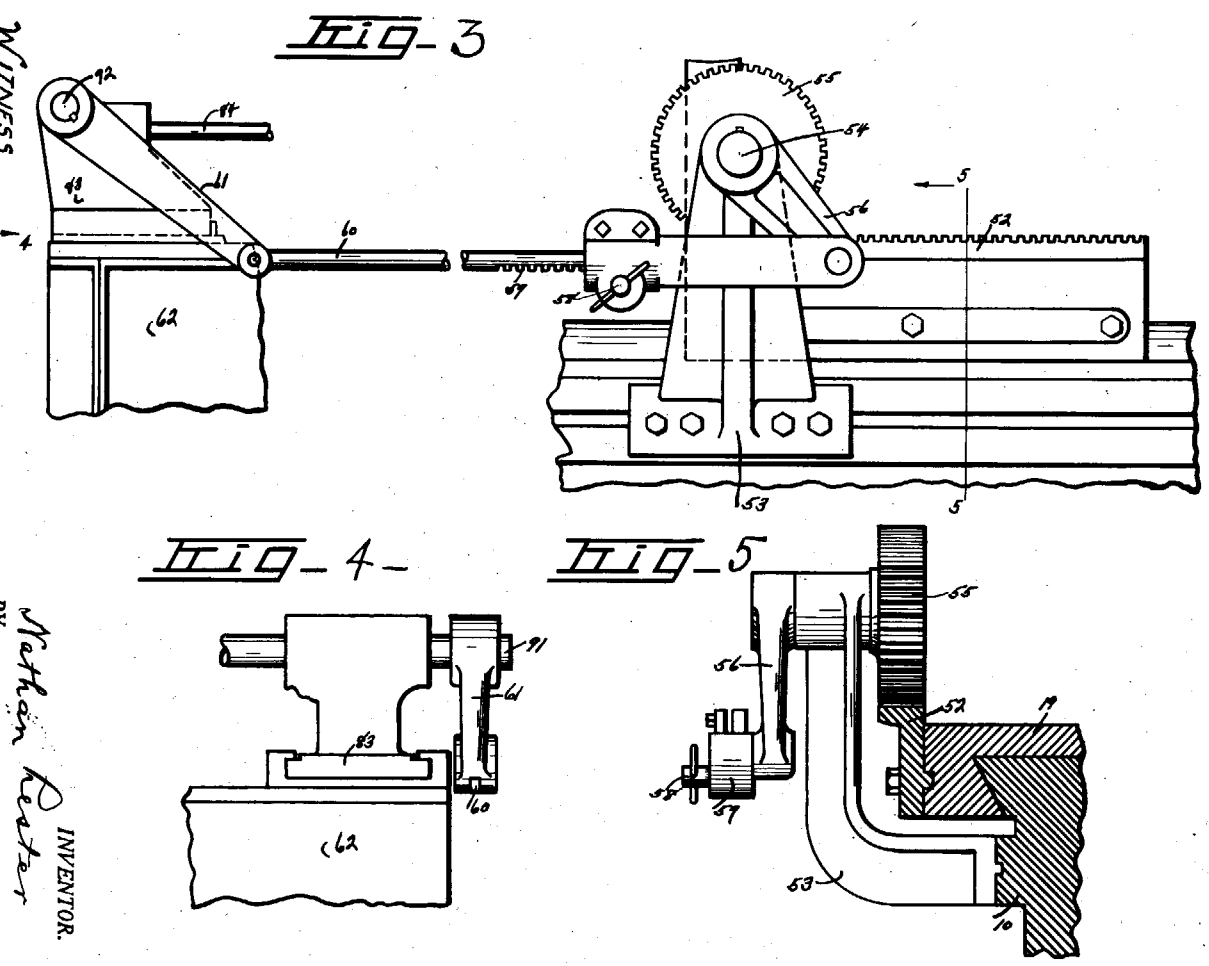
Figure 3 is a side view of the connecting parts between the die operating means and pump.
Figure 4 is an end view of the same.
Figure 5 is a sectional view on the line 5—5, of Figure 3.

Figures 15, 16 and 17 are views of the cams which control the operation of the pump and dies, shown in three different positions.

Referring first to the first three sheets of drawings, which illustrate particularly the die operating mechanism, it will be seen that the machine embodies a frame —10— carrying a stationary vertical plate —11— against which one of the dies —12— is adapted to bear and a slidable vertical plate —13— carrying the other die —14— with it. There is also a stationary end piece —15— which is mounted on ways on the bed or frame —10— and is adjustable therealong by bolts extending into or through the frame. The adjustment is to provide for dies of different thickness. This end plate —15— is secured to the end plate —11— by threaded horizontal rods —16—. The plate —13— has a slide or base —19— extending to the rear adapted to slide on the ways —18— at the top of this part of the frame —10—.

Supported by the end plate —15— is a cylinder —20— within which is a piston —21— provided with a piston rod —22— which carries a sliding rack —23— which is of a double character as it has rack teeth on its opposite sides. This rack is adjusted on the rod by means of screw and nut connection —24— and it is provided with a downwardly extending portion having longitudinal guide surfaces —25— guided in a pair of gibs —26— secured to the slide or base —19— so that the rack will be constrained to move in a rectilinear manner on the top of this part of the frame.

The vertical plate —15—, which is fixed in stationary position, carries brackets —27— carrying studs —28— on opposite sides of the rack. On each of the pivot studs is pivoted a gear segment —29— meshing with one of the racks.

Fixed to each segment is an arm —30— which swings with the gear segment and is connected by a lever —38— with a link —39— pivoted thereto and also pivoted on a projection on the movable plate —13—. These levers —38— and arms —39— are provided with projections —40— and —41— which, when the parts are in the extreme position shown in Figure 7, abut against each other and prevent the link and lever constructions from passing beyond the dead center, thus limiting the action.

The arms —30—, levers —38— and links —39— function as a toggle joint, and it will be noted that when the dies are closed, with the parts in the position shown in Figure 7, the pivots of the arms —30—, levers —38—, links —39— and the pivots on the plate —13— will be on a straight line, as will the arms —30—, levers —38—, and links —39—.

With the parts in this position, it is impossible for the plate —13— to move backwardly to open the dies even if the pressure on the piston —21— is for any reason interrupted or relaxed. This absolute locking of the dies in the closed position precludes any possibility of the dies opening when the metal is forced into them which sometimes happens with other machines with resulting danger of injury to the operator and/or spoilage of the casting.

Figure 6:
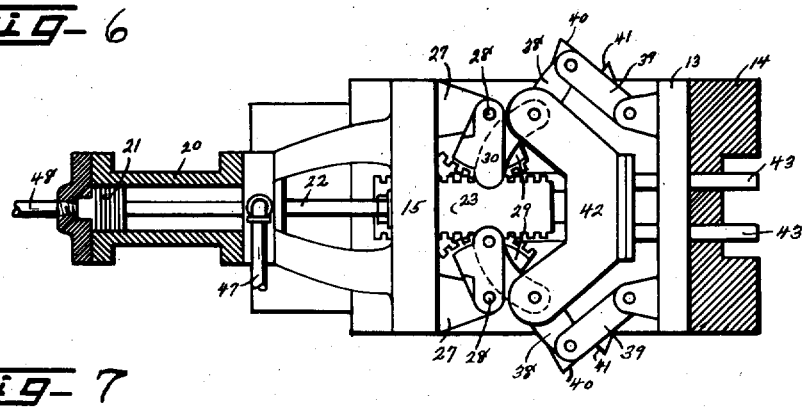
Figures 6 and 7 are enlarged views of the die operating mechanism shown in two extreme positions.

The levers —38— are pivoted, it will be obvious, at one end of the arms —30— and to the link —39— at the opposite end. In the middle they are pivoted to a head —42— which is arranged to move longitudinally but at a different rate of speed from the rack —23—. This will be obvious from the connections shown in Figures 6 and 7. This head is provided with a pair of ejectors —43— in the form of rods or plates. While in casting position, these ejectors project beyond the plate —13— into spaces in the die —14— and extend clear to the casting face of the mold cavity of which their ends constitute a part. When moved from the position shown in Figure 7, to that shown in Figure 8, these rods eject a casting. This ejection is due to the fact that, on account of the leverage, the die —14— is retracted faster than the head —42— and ejectors —43—.

The cylinder and plunger —21— which are used for operating the die section —14— and the ejection of the casting is intended to be operated by any kind of fluid but I have shown herein a mechanism for operating it by oil. The oil is furnished by an oil pump —43*a*—, the details of which are not shown, but it delivers and discharges through two pipes —44— and —45— to a valve casing —46— and is so constructed that the oil in these pipes is under pressure all the time while the oil pump is running. In this casing —46— there are valves, mounted on a shaft —50—, which control the passage of oil from the pipes —44— and —45— respectively to two pipes —47— and —48— which lead into the opposite ends of the cylinder —20—. It will be obvious that in accordance with the operation of these valves the oil will be admitted to one end or the other of the cylinder and force the piston back or forward. This cylinder itself has no valves, being controlled entirely by the direction of flow of the operating liquid. The valves in the casing —46— are located on the shaft —50— which is provided with an operating handle —51— so that the operation of this part of the machine is controlled by the shifting of this handle back and forth. The valves operated by this handle are so related to each other, of course, that the motor fluid cannot be forced into both ends of the cylinder —20— at the same time. The oil pump and these valves are not shown as they are obtainable on the market and the details thereof are not a part of this invention.

Mounted on the base or slide —19— is a rack —52— which can be adjusted along the slide —19—. Mounted on brackets —53— on the frame —10— is a shaft —54— carrying a gear —55— meshing with the rack —52—. On this shaft —54— is a crank —56— which is connected with a rod —57—. The reciprocation of the rack —52— causes the gear to oscillate and the rod —57— to be moved back and forth. This rod is provided with an adjusting screw —58— meshing with a rack —59— cut on the surface of a link —60— which is in turn connected with an arm —61— for a purpose to be described. It will be seen therefore, that the reciprocation of the double rack —23— by means of the piston in the cylinder opens and closes the die and ejects the casting therefrom and further operates this arm —61— to swing it about its axis. This arm —61— operates the pump to fill the dies as will appear below.

The pumping means for this machine comprises a melting furnace —62— preferably on the frame —10— having therein a melting pot —63— in which a supply of metal is maintained. The pump is operated by air pressure controlled from a handle or lever —64— fixed on a shaft —68— which handle is located near the handle —51— so that the operator can attend to both of them. The shaft —68— extends to the pump and is provided with two cams or eccentrics —73— and —74— which operate valves in a valve casing —77— to control the connection of the pump with two pipes —75— and —76— which, as will be described later, exert pressure on the metal in the pump to force it into the mold at certain times.

On the controlling shaft —50— is a cam —66—. This cam is of circular shape all around except for a notch —67— at one point. On the shaft —68— below there is another cam —69— which is of general circular form but also with a notch —70— of the same size and shape as the notch —67—. Each of these notches, as will be observed from comparison of Figures 15, 16 and 17, is of such shape that the other cam can rotate when in registration with that notch but not otherwise. Each notch is of the shape of an arc of the circle of the other cam. The shafts —50— and —68— have their axes at a distance apart less, by the width of one of the notches, than the sum of the radii of the two cams.

In the position shown in Figure 16, either cam can be turned from its position, but in the positions shown in Figures 15 and 17 only one cam can turn. The cam —69— also has another notch —71— which cooperates with a pin —72— to constitute a stop. This cam simply oscillates the length of this slot and cannot move beyond it. The valves —73— and —74— connect the air inlet —75— with the pipe —76— when the cam —74— closes its valve and the cam —73— opens the other valve.

The control of the air to the pump and the control of the oil to the operating cylinder are both manual. The latter, as stated above, actuates the arm —61— which is located on a shaft —91—. This shaft is mounted on a base —83— which is provided with ways below and is capable of a slight sliding motion. This is an important feature, because it is secured by longitudinal rod —84— to the stationary plate —11—. On account of the expansion of the metal of which the parts are made under the influence of heat and the subsequent contraction, some of the metal parts would break. The support —83— is mounted in this way so that it can move back and forth, but of course it will be understood that this is only a slight movement in accordance with the temperature of the parts on which these elements are supported.

On the shaft —91— is an arm —85—. This is connected by a link —88— with a stud —86— on the pump —81—. This pump is of the goose-neck type provided with a nozzle —82— and located within the melting pot and normally below the level of metal therein so that it will fill by gravity through the nozzle. It is supported by a pair of brackets —87— extending upwardly from the melting furnace and carrying a cross shaft —89—. On this cross shaft is pivoted a link —90— which depends therefrom and is connected with the stud —86— so as to support one end of the melting pot from above. Each bracket —87— carries at the top a clamp —93— having projecting ends below extending under the ends of the bearing and held in position by a bolt —94—.

At the top of the pot —81— are integral lugs —103— under which extends the ends of a clamp —104— similar to the clamp —93— secured above by a bolt —105— for holding the cover —106— on the pot. This cover is provided with an air passage —107— and a nozzle —108—. This nozzle is adapted to fit in a cup-shaped nipple —109— which is directly connected with the pipe —76—. Adjacent to this nipple —109— are guide pins —110— entering holes in the cover —106— to guide the pump to move rectilinearly when it gets up to position for operation. When this happens the nozzle —82— is also registered in a gland —111— which is provided with a water circulating groove —112— applied in any desired way to keep this gland cool and extend its life. On the furnace is a stud —96— mounted in suitable bearings and carrying a plate —97— which can be adjusted by screws —98— to have the proper angle so that link —99— pivoted on this plate —97— will be located in the proper position. This link is provided with a transverse pin —100— which receives a downwardly opening rest or bearing —101— on a projection —102— fixed to, or cast integral with, the pneumatic pump —81—. This arrangement of the parts —91—, —89—, and —100— together with the location of the end of the rod —60— with respect to the plate —13—, allows of the proper operation of the pneumatic pump —81— from the filling position shown in Figure 10 to casting a position shown in Figure 1 and back again.

The operation of the machine is as follows:—With the mold open and the pump in the position shown in Figure 10, the crank —51— is turned a half revolution from the position in which the handle is vertically above the shaft —50— to its opposite position in which it is vertically below it as shown. The valves are in position to prevent flow of air to the pump the dies being open and being held open by the oil in the pipe —47—. Now the first effect of the turning of the handle into this position is to open one valve in the casing —46— to release the oil from in front of the piston —21—. Then the other valve is opened to allow the oil to be forced through pipe —48— into the cylinder behind the piston. The result of this is to move the parts from the position shown in Figure 6 to the position shown in Figure 7. This forces forward the sliding plate —13— closes the dies, and withdraws the ejectors —43—. The movement of the rack —52— forward actuates the rod —60— to swing the pump —81— upwardly. As it reaches the upward limit of its stroke, it also moves forwardly through the straightening out of the construction formed of the arm —85— and the link —88— and forces the nozzle —82— directly into the sprue opening in the plate —11—. At the same time, the crank —51—, having now reached the bottom, the notch —67— will have come into register with the notch —70— from the position shown in Figure 15 into that shown in Figure 16. Now the handle —64— on the shaft —68— is turned to bring this shaft around. This admits air to the pneumatic pump —81— at the top as will be obvious. Now the metal is forced into the mold by the air. The parts are left in this condition a very short period, just long enough for the casting to chill and retain its shape. Then the handle —64— is turned back and the air released from the top of the metal in the pump and then exhausted. This having been accomplished, the crank —51— is turned the rest of the way around the circle to its original position. This results in the opposite action of the valves in the casing —46— so as to release the oil from the outer side of the piston in the cylinder —20—. Immediately the other valve changes and the oil is forced through the pipe —47— to force back the piston. This restores the parts to the position shown in Figure 6 and it will be seen that the ejectors —43—, although drawn back slightly, are not drawn back as much as the plate —13—. Therefore the casting in the mold is ejected by this action although the die —14— is attached to the plate —13— and drawn back with it.

It will be seen therefore that the dies are manipulated to open and close simply by the turning of the handle —51— around 180 degrees and that the control of the air to the pump is also accomplished in a very simple way and controlled absolutely by the position of the handle —51— but operated by the handle —64—. The pneumatic pump is moved bodily under the control of the handle —51— and the location of the several points of support and connections which have been shown. It is forced to assume the different positions in proper sequence without any attention on the part of the operator except to operate the handles —51— and —64—. The casting is released from the mold on account of the arrangement of the nozzle of the pump and the ejecting devices which have been described in full. This ejection is not left to chance but is made positive by the ejectors which will force it out, even though there might be something to cause it otherwise to stick. The whole operation is very simple and the machine itself is reduced to a small number of parts and yet has all the safety features which are necessary in these machines.

Although I have illustrated and described only a single form of the invention I am aware of the fact that modifications can be made therein by any person skilled in the art without departing from the scope of the invention as expressed in the claims.

Therefore, I do not wish to be limited to all the details of construction herein shown and described, but what I do claim is:—

1. In a die casting machine, the combination with a piston and cylinder, of an oil pump, two outlet pipes from the oil pump, a pipe extending to each end of said cylinder for conducting the fluid to operate the piston, a valve casing to which all of said pipes extend, a shaft in said valve casing, means for connecting one pair of pipes with the other pair so that the oil can be supplied to either end of the cylinder for operating the piston and there will be no chance for it to enter both ends at the same time, and a handle on the shaft for oscillating it.

2. In a die casting machine, the combination with a pair of dies and means for operating the dies comprising a double rack and gear segments on the opposite sides of the rack, a slide connected with said gear segments for reciprocation to operate one of the dies, and guides on said slide for receiving the rack and guiding it to move in a rectangular manner.

3. The combination with a pair of dies and a rod, of means for reciprocating said rod, of a double rack adjustably fixed on the rod, a pair of gear segments on opposite sides of the rack, meshing therewith, and each pivoted at a stationary point, levers pivotally connected with the segments, a link pivoted to the other end of each lever and to one die, a head freely slidable and having an ejector for ejecting a casting from the mold, said head being pivoted to said levers whereby when the rod is withdrawn the head will be withdrawn but at a slower rate so that the ejectors will project further and eject the casting.

4. In a die casting machine, the combination with a pair of dies, an ejector for the casting, and means for operating the dies comprising a double rack and gear segments on the opposite sides of the rack, a slide connected with said gear segments for reciprocating one of the dies and ejector, another rack fixed with respect to said slide, a gear meshing with the last-named rack and adapted to turn on a stationary axis and having an arm projecting from its shaft, a pump for supplying the dies with metal, and means operated by said arm for operating the pump.

5. In a die casting machine, the combination with a pair of dies and means for operating one of them, of a rack connected to and movable with one die when it is operated, a gear meshing with said rack, an adjustable link connected with said gear to be reciprocated thereby as the gear oscillates, a pump for supplying the dies with molten metal, and means operated by said link for moving the pump bodily up to casting position.

6. In a pump for a die casting machine, the combination with a melting pot, of a pump body adapted to be submerged in the metal of the melting pot for filling the pump, means for moving said pump bodily, said pump having a horizontal nozzle for delivering to the dies in a horizontal direction, a second nozzle above, and a stationary plate having a metal receiving gland for receiving the lower nozzle and a fixed nipple connected with a compressed air supply for receiving the second nozzle so that air can be admitted to the pump over the metal therein, the two nozzles being adapted to come to their two seats simultaneously as the pump moves up to casting position.

7. In a pump for a die casting machine, the combination with a melting pot, of a pump body adapted to be submerged in the metal of the melting pot for filling the pump and heating it, means for reciprocating and rocking said pump with a motion that will dip it in the molten metal and fill it through its nozzle and bring it up out of the metal for delivery, said pump having a nozzle for delivering to the dies, and a second nozzle above, a nipple connected with a compressed air supply for receiving the second nozzle so that air can be admitted to the pump over the molten metal, the two nozzles being adapted to come to their two seats simultaneously as the pump moves up to casting position, a plate on which one member of a pair of dies is mounted, said plate having an opening for receiving the metal delivery nozzle, and a gland in said opening, the nipple also being supported in fixed position on said plate.

8. In a pump for a die casting machine, the combination with a melting pot, of a pump body adapted to be submerged in the metal of the melting pot for filling the pump and heating it, a cover for the pump, means for reciprocating said pump with a motion that will dip it in the molten metal and then fill it and bring it up out of the metal for delivery, said pump having a nozzle for delivering to the dies and a second nozzle above, a nipple connected with a compressed air supply for receiving the second nozzle so that air can be admitted to the pump and two nozzles being adapted to come to their two seats simultaneously as the pump moves up to casting position, horizontal guide rods carried by said plate adjacent to said nipple adapted to engage the top of the pump for guiding both nozzles horizontally into proper position, and means for clamping the cover on the pump.

9. In a pump for delivering molten metal, the combination with a melting pot, of a pump body located therein, means for moving the pump body from a position in which its nozzle will dip under the metal in the pot to fill the pump upwardly and then horizontally to a position in which it will engage the die for delivering metal thereto, said means comprising a shaft with arms thereon for moving the pump as the shaft turns, a support for said shaft, and means on the furnace for carrying said support in a manner in which it is free to reciprocate to compensate for contraction and expansion of the parts of the device.

10. In a die-casting machine, the combination with a cylinder and a piston operated by a non-compressible fluid, of a pair of dies, a stationary plate, a toggle arm pivotally mounted on the plate, a movable plate secured to one of the die sections, toggle connections between the toggle arm and the movable plate, a melting pot, a casting pump movably mounted in the melting pot, and means actuated by the piston for simultaneously moving the die section to the closed position and the pump to the casting position.

11. A die-casting machine comprising a movable plate adapted to carry a die section, a stationary plate, links each having one end pivoted to spaced portions of the movable plate, additional links each having one end pivoted to spaced portions of the stationary plate, levers each having their opposite ends pivoted respectively to one of the first named links and one of the additional links, a cross-head, separate means for pivotally connecting the intermediate portions of the levers to spaced portions of the cross-head, a cylinder, means for supplying oil to opposite ends of the cylinder, a piston in the cylinder, a piston rod connected to the piston, and means in connection with the piston rod for rocking the additional links about their pivots on the stationary plate to thereby rock the levers about their pivots on the cross-head.

12. A die-casting machine comprising a movable plate adapted to carry a die section, a stationary plate, links each having one end pivoted to spaced portions of the movable plate, additional links each having one end pivoted to spaced portions of the stationary plate, levers each having their opposite ends pivoted respectively to one of the first named links and one of the additional links, a cross-head, separate means for pivotally connecting the intermediate portions of the levers to spaced portions of the cross-head, a cylinder, means for supplying oil to opposite ends of the cylinder, a piston in the cylinder, a piston rod connected to the piston, means in connection with the piston rod for rocking the additional links about their pivots on the stationary plate to thereby rock the levers about their pivots on the cross-head, and means for limiting the rocking movement of the levers in one direction.

13. A die-casting machine comprising a movable plate adapted to carry a die section, a stationary plate, links each having one end pivoted to spaced portions of the movable plate, additional links each having one end pivoted to spaced portions of the stationary plate, levers each having their opposite ends pivoted respectively to one of the first named links and one of the additional links, a cross-head, separate means for pivotally connecting the intermediate portions of the levers to spaced portions of the cross-head, and means for locking the additional links to thereby rock the levers on their pivots on the cross-head.

14. In a die-casting machine, a cylinder, a piston movable within the cylinder, a stationary plate, a toggle arm pivotally mounted on the stationary plate, a movable plate adapted to carry a die section, locking toggle connections between the toggle arm and the movable plate, and means including a non-compressible fluid for positively actuating said piston in reverse directions to rock the toggle arm and carry the movable plate to and from die-casting position.

15. In a die-casting machine, a cylinder, a piston movable within the cylinder, a stationary plate, a toggle arm pivotally mounted on the plate, die sections, a movable plate adapted to carry one of said die sections, locking toggle connections between the toggle arm and the movable plate, a melting pot, a casting pump movably mounted in the melting pot, and means including a non-compressible fluid for positively moving said piston within said cylinder to move the movable plate to closed position of the dies through the medium of said toggle connections and for simultaneously moving the casting pump to casting position.

16. In a die-casting machine, a cylinder, a piston movable in the cylinder, a stationary plate, a movable plate adapted to carry a die section, a locking toggle joint having one arm connected to the stationary plate and another arm connected to the movable plate, a second lockable toggle joint having one arm connected to the stationary plate and another arm connected to the movable plate, and means including a non-compressible fluid for positively actuating the piston to move the said movable plate to die-casting position through the medium of said toggle joints.

In witness whereof, I have hereunto set my hand this 7th day of June, 1929.

NATHAN LESTER.